No. 691,965. Patented Jan. 28, 1902.
J. H. ORMSBY.
COMBINED DUST PAN AND BROOM HOLDER.
(Application filed Sept. 26, 1901.)
(No Model.)
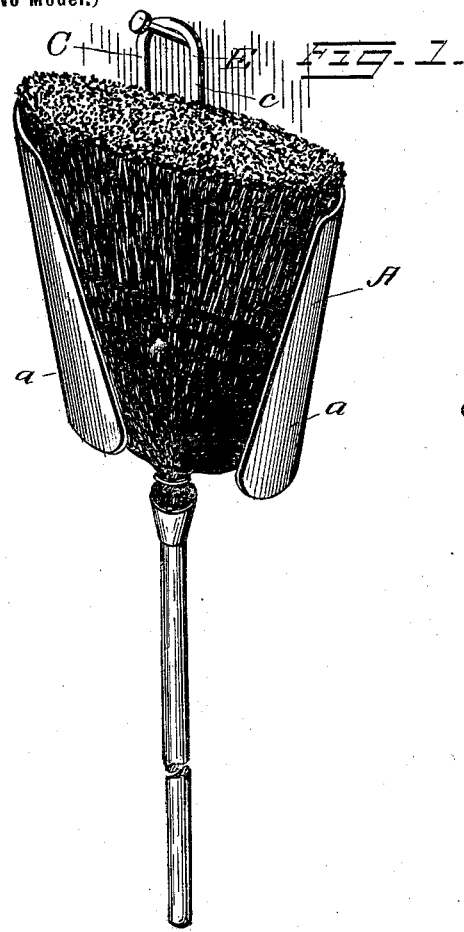
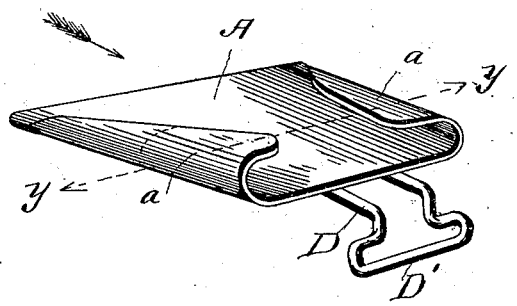
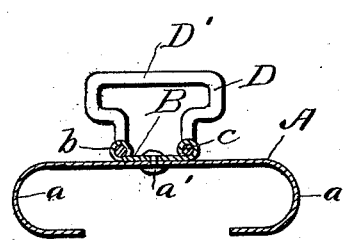
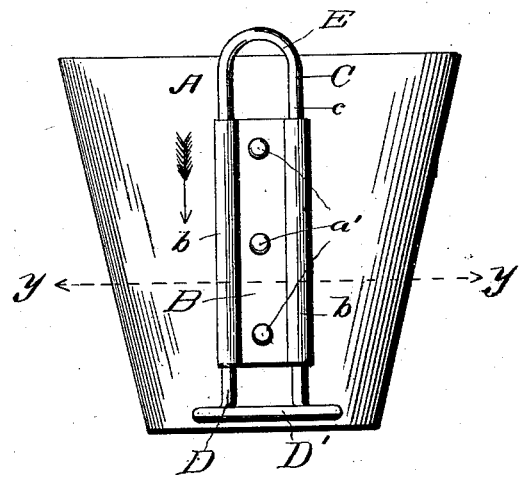
Witnesses
Inventor
John H. Ormsby
By Lehmann & Walton
Attorneys

UNITED STATES PATENT OFFICE.

JOHN H. ORMSBY, OF BOLTON LANDING, NEW YORK.

COMBINED DUST-PAN AND BROOM-HOLDER.

SPECIFICATION forming part of Letters Patent No. 691,965, dated January 28, 1902.

Application filed September 26, 1901. Serial No. 76,623. (No model.)

*To all whom it may concern:*

Be it known that I, JOHN H. ORMSBY, a citizen of the United States, residing at Bolton Landing, in the county of Warren and State of New York, have invented certain new and useful Improvements in a Combined Dust-Pan and Broom-Holder; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to new and useful improvements in dust-pans, and especially to that kind or class embodying a receptacle which may be used as a dust-pan or inverted and suspended upon a suitable support to serve as a holder for a brush or broom; and the object of the invention is to provide a utensil having the combined uses mentioned which will be simple and durable in construction and inexpensive of manufacture.

A further object is to provide a dust-pan of the character set forth with an improved handle, which can readily and conveniently be manipulated or adjusted to serve as a suspension device for the said pan when it is inverted in order to assume the function of a broom-holder.

The invention consists in the improved construction to be more fully described hereinafter, and the novelty of which will be particularly pointed out and distinctly claimed.

I have fully and clearly illustrated my invention in the accompanying drawings, wherein—

Figure 1 is a view in perspective, showing the device employed as a broom-holder. Fig. 2 is a perspective of the device in position to be utilized as a dust-pan. Fig. 3 is a cross-section on the line $y\ y$ of Fig. 2, and Fig. 4 is a rear elevation showing the improved handle for the dust-pan and suspension device for the broom-holder when the pan is so employed.

Referring to the drawings, A designates the body portion or receptacle of the dust-pan, which is made of any material suitable to the purposes and usages for which it is intended. The side edges of this receptacle A are bent upwardly and then inwardly to form side flanges or walls $a$, which serve to prevent the sweepings from falling over the sides of the receptacle and also to provide a convenient means for retaining a brush or broom. The body of the receptacle and the walls or flanges $a$ are tapered from front to rear in order that the head of a broom may be securely held in place and be prevented from sliding through the open end of the utensil when it is inverted and employed as a broom-holder.

Upon the back or bottom of the pan A and extending longitudinally thereof is suitably secured, as by rivets $a'$, a strip of metal or other suitable material B, said strip having its longitudinal edges turned upwardly and inwardly to form a hollow bead or guideway $b$, extending the entire length on either side of the said strip. Projected through the said hollow bead $b$ and adapted to slide therein are the side arms $c$ of a loop C, formed of wire or other suitable material, said loop constituting a sliding member embodying a combined handle and suspension device or hanger for the broom-holder and dust-pan. The side arms $c$ of the loop C are of sufficient length to extend beyond the rear edge of the pan or receptacle to form a handle D, said handle being bent downwardly and expanded laterally, as at D', to form a foot or support for the pan in order to hold the same at a convenient angle for receiving the sweepings.

When it is desired to employ the pan as a broom-holder, the handle D is thrust inwardly through the hollow beads $b$ on the receptacle until the end E of the loop C projects beyond the front edge of the pan, which is then inverted and the end E of the loop passed over any suitable or convenient means to support the pan in such inverted position. The utensil is then in position to receive the broom or brush, which is passed down through the receptacle until the head of the broom engages the inclined walls $a$, which hold it securely in position, substantially as shown in Fig. 1 of the drawings.

From the above description, taken in connection with the drawings, it will be seen that I have provided a utensil of extreme simplicity and well adapted to accomplish the dual use for which it is designed and that the improved handle provides a convenient and efficient means of suspension when it is desired to employ the pan as a broom-holder.

What I claim, and desire to secure by Letters Patent, is—

1. As an improved article of manufacture, a combined dust-pan and broom-holder comprising a receptacle and a combined handle and suspension device adjustably secured thereto and adapted to be projected beyond either the front or rear edge thereof.

2. As an improved article of manufacture, a combined dust-pan and broom-holder comprising a receptacle and a combined handle and suspension device slidably mounted thereon and adapted to be projected beyond either the front or rear edge thereof.

3. As an improved article of manufacture, a combined dust-pan and broom-holder comprising a receptacle and a sliding member mounted thereon having one end formed to constitute a suspension device and its opposite end formed to constitute a hand-grasp.

4. As an improved article of manufacture, a combined dust-pan and broom-holder, comprising a receptacle, guideways on the back of the receptacle and a sliding member in the said ways, arranged to be projected beyond the front edge of the receptacle to provide a suspension device or beyond the rear edge of said receptacle to provide a handle.

5. As an improved article of manufacture, a combined dust-pan and broom-holder, comprising a receptacle, parallel guideways on the receptacle and a sliding member comprising parallel side arms to slide in the said guideways and provided at one end with a suspension-loop and at the other end with a handle.

6. As an improved article of manufacture, a combined dust-pan and broom-holder, comprising a receptacle, a strip extending longitudinally of the said receptacle and having its edges formed to provide parallel guideways and a sliding member movable in the said guideways and arranged to be projected beyond the front edge of the said receptacle to provide a suspension device or beyond the rear edge thereof to provide a handle.

7. As an improved article of manufacture, a combined dust-pan and broom-holder comprising a receptacle formed from a substantially rectangular blank having its sides bent to form broom-retaining members, and a combined handle and suspension device slidably mounted on the said receptacle and adapted to be extended over either the front or rear edge thereof.

8. As an improved article of manufacture, a combined dust-pan and broom-holder, comprising a receptacle formed from a blank having its sides bent to form broom-retaining members parallel to the body of the receptacle, and tapering from the front to the rear edge thereof, the rear portion of said receptacle being open for the withdrawal of the broom, and a combined handle and suspension device slidably mounted on the said receptacle and adapted to be extended over the front or rear edge thereof.

In testimony whereof I affix my signature in presence of two witnesses.

JOHN H. ORMSBY.

Witnesses:
 LULU M. ORMSBY,
 NINA P. ORMSBY.